US009965884B2

(12) United States Patent
Liu et al.

(10) Patent No.: US 9,965,884 B2
(45) Date of Patent: May 8, 2018

(54) METHOD AND DEVICE FOR DETERMINING SCORING MODELS OF A THREE-DIMENSIONAL ANIMATION SCENE FRAME

(71) Applicant: BEIJING UNIVERSITY OF POSTS AND TELECOMMUNICATIONS, Beijing (CN)

(72) Inventors: Liang Liu, Beijing (CN); Huadong Ma, Beijing (CN); Zeyu Wang, Beijing (CN); Dawei Lu, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 154 days.

(21) Appl. No.: 14/993,612

(22) Filed: Jan. 12, 2016

(65) Prior Publication Data
US 2017/0109918 A1  Apr. 20, 2017

(30) Foreign Application Priority Data
Oct. 15, 2015  (CN) .......................... 2015 1 0664652

(51) Int. Cl.
*G06T 13/20* (2011.01)
*G06K 9/62* (2006.01)
(Continued)

(52) U.S. Cl.
CPC ............ *G06T 13/20* (2013.01); *G06K 9/6269* (2013.01); *G06T 7/97* (2017.01); *H04N 13/0022* (2013.01);
(Continued)

(58) Field of Classification Search
CPC ......... G06T 13/20; G06T 7/97; G06K 9/6269; H04N 13/0022; H04N 13/0033; H04N 13/0239; H04N 13/0271
(Continued)

(56) References Cited

U.S. PATENT DOCUMENTS

| 2013/0027568 A1* | 1/2013 | Zou ..................... H04N 17/004 348/192 |
| 2013/0155192 A1* | 6/2013 | Hsiao ................ H04N 13/0221 348/46 |

FOREIGN PATENT DOCUMENTS

CN  103581661  2/2014

OTHER PUBLICATIONS

Zhang, Xiaonan, "Visual Comfort Assessment of Stereoscopic Images with Multiple Salient Objects", Aug. 6, 2015, IEEE, pp. 1-6, [retrieved on Jul. 18, 2017], Retrieved from the Internet <URL: http://ieeexplore.ieee.org/stamp/stamp.jsp?tp=&arnumber=7177223&isnumber=7177182>.*

(Continued)

*Primary Examiner* — Barry Drennan
*Assistant Examiner* — Terrell Robinson
(74) *Attorney, Agent, or Firm* — Norton Rose Fulbright US LLP

(57) ABSTRACT

Methods and devices for determining scoring models of a three-dimensional animation scene frame are provided. A method can include obtaining a dataset of three-dimensional animation scene frames; obtaining a predetermined stereoscopic effect standard score and a predetermined visual comfort standard score corresponding to each three-dimensional animation scene frame; obtaining the disparity map of each three-dimensional animation scene frame, extracting disparity statistic features of each three-dimensional animation scene frame based on its disparity map, and combining
(Continued)

the disparity statistic features into one feature vector; and, determining the stereoscopic effect scoring model and the visual comfort scoring model for a three-dimensional animation scene frame respectively based on the feature vector of each three-dimensional animation scene frame in conjunction with the corresponding stereoscopic effect standard score and visual comfort standard score, in order to reduce the influence of subjective factors from the producers on the scoring.

14 Claims, 5 Drawing Sheets

(51) Int. Cl.
*H04N 13/00* (2018.01)
*H04N 13/02* (2006.01)
*G06T 7/00* (2017.01)

(52) U.S. Cl.
CPC ..... *H04N 13/0033* (2013.01); *H04N 13/0239* (2013.01); *H04N 13/0271* (2013.01); *G06T 2207/20228* (2013.01); *G06T 2207/30168* (2013.01); *H04N 2013/0081* (2013.01)

(58) Field of Classification Search
USPC .......................................................... 345/419
See application file for complete search history.

(56) References Cited

OTHER PUBLICATIONS

Jung, Yong Ju, "Visualizing the Perceived Discomfort of Stereoscopic Videos", Feb. 1, 2013, IEEE, pp. 169-174, [retrieved on Jul. 18, 2017], Retrieved from the Internet <URL: http://ieeexplore.ieee.org/stamp/stamp.jsp?tp=&arnumber=6424654&isnumber=6424436>.*

Jung, Yong Ju, "Predicting Visual Discomfort of Stereoscopic Images Using Human Attention Model", Dec. 12, 2013, IEEE, vol. 23, pp. 2077-2082, [retrieved on Jul. 18, 2017], Retrieved from the Internet <URL: http://ieeexplore.ieee.org/stamp/stamp.jsp?arnumber=6544568>.*

* cited by examiner (a) disparity map　　(b) disparity gradient map　　(c) disparity distribution histogram (a) disparity map    (b) disparity gradient map    (c) disparity distribution histogram

METHOD AND DEVICE FOR DETERMINING SCORING MODELS OF A THREE-DIMENSIONAL ANIMATION SCENE FRAME

CROSS-REFERENCE TO RELATED APPLICATIONS

This application claims the benefit of Chinese Application No. 201510664652.X, filed Oct. 15, 2015. The contents of the referenced application are incorporated herein by reference.

TECHNICAL FIELD

The present invention relates to the technical field of three-dimensional animation production, and particularly to a method and a device for determining scoring models of a three-dimensional animation scene frame.

BACKGROUND ART

The three-dimensional animation technology is widely used in visualization presentation field such as movies, games, education and the like. It is possible to ensure various steps of the animation production process not to be affected by environmental factors such as equipment, sites and the like by using three-dimensional animation technology, which has an incomparable inherent is advantage in final visual effect presentation of contents.

Generally, during the animation production process, adjusting and controlling the stereoscopic visual effect of a three-dimensional animation scene frame is obtained mainly based on the stereoscopic parameters set by the producers during the production steps. The stereoscopic parameters directly determines the stereoscopic three-dimensional visual effect of the final animation content, the quality of which even affects the producing schedule of the whole three-dimensional animation product. Therefore, it is very important to score a three-dimensional animation scene frame.

In the prior art, judging whether a three-dimensional animation scene frame is good or not is mainly based on the subjective assessment of the producers, and the assessment standard is much affected by the subjective factors from the producers. At the same time, the assessment process is likely to be affected by the prevailing testing environment and the projecting equipment. Furthermore, the workload is huge and the efficiency is low.

SUMMARY OF THE INVENTION

An objective of embodiments of the present invention is to provide a method and a device for determining scoring models of a three-dimensional animation scene frame, so as to achieve automatic scoring of a three-dimensional animation scene frame, which reduces the effects of the subjective factors from the producers, with reduced workload and improved efficiency. The specific technical solution is as follows:

obtaining a dataset of three-dimensional animation scene frames, the dataset comprising a first number of three-dimensional animation scene frames;

obtaining a predetermined stereoscopic effect standard score and a predetermined visual comfort standard score corresponding to each three-dimensional animation scene frame;

obtaining the disparity map of each three-dimensional animation scene frame, extracting disparity statistic features of each three-dimensional animation scene is frame based on its disparity map, and combining the disparity statistic features into one feature vector;

establishing a first regression function, wherein the stereoscopic effect score of a three-dimensional animation scene frame is represented by the first regression function of the feature vector, solving the first regression function by using the corresponding stereoscopic effect standard scores as the output value of the first regression function and by introducing a kernel function using the method of penalty factor-support vector machine $\epsilon$-SVR for regression, and determining a second regression function obtained by solving the first regression function as the stereoscopic effect scoring model of a three-dimensional animation scene frame; establishing a third regression function, wherein the visual comfort score of a three-dimensional animation scene frame is represented by the third regression function of the feature vector, solving the third regression function by using the corresponding visual comfort standard scores as the output value of the third regression function and by introducing a kernel function using the method of penalty factor-support vector machine $\epsilon$-SVR for regression, and determining a fourth regression function obtained by solving the third regression function as the visual comfort scoring model of a three-dimensional animation scene frame.

Optionally, the step of obtaining a dataset of three-dimensional animation scene frames comprises: obtaining stereoscopic image pairs of different three-dimensional animation scene frames under a same stereoscopic parameter setting and stereoscopic image pairs of a same scene frame under different stereoscopic parameter settings, the obtained stereoscopic image pairs being used as the dataset of three-dimensional animation scene frames.

Optionally, the step of extracting disparity statistic features of each three-dimensional animation scene frame based on its disparity map comprises:

calculating the disparity statistic features according to the equations below:

$$\text{mean disparity } MD: MD = \frac{1}{MN}\sum_{i=1}^{M}\sum_{j=1}^{N} D(i,j)$$

$$\text{median disparity } MED: MED = \text{median}\left(\sum_{i=1}^{M}\sum_{j=1}^{N} D(i,j)\right)$$

$$\text{maximum positive disparity } MPD: MPD = \max\sum_{i=1}^{M}\sum_{j=1}^{N} D(i,j)$$

$$\text{maximum negative disparity } MND: MND = \min\sum_{i=1}^{M}\sum_{j=1}^{N} D(i,j)$$

$$\text{disparity standard deviation } DSD: DSD = \sqrt{\frac{1}{MN}\sum_{i=1}^{M}\sum_{j=1}^{N} D(i,j-MD)^2}$$

$$\text{mean disparity gradient } MDG: MDG = \frac{1}{MN}\sum_{i=1}^{M}\sum_{j=1}^{N} [\Delta D(i,j)]$$

wherein $D(i,j)$ is the disparity value of each pixel in the disparity map of each three-dimensional animation scene frame, i is the abscissa of the disparity map of each three-dimensional animation scene frame, j is the ordinate of the disparity map of each three-dimensional animation scene frame, M, N are the width and the height of the disparity map of each three-dimensional animation scene frame respectively, and ΔD(i, j) is the value of each pixel in the disparity gradient map of each three-dimensional animation scene frame obtained after Laplace transform.

Optionally, the stereoscopic effect scoring model of a three-dimensional animation scene frame is:

$$Q_{SE} = \sum_{i=1}^{totalSESV} sv\_cof_i \times \mathcal{K} \langle SESVs_i, x \rangle$$

wherein $Q_{SE}$ is the stereoscopic effect score of a three-dimensional animation scene frame, totalSESV is the number of stereoscopic effect support vectors, $sv\_cof_i$ is the coefficient value corresponding to the i-th to support vector in the model's parameters, $\mathcal{K} \langle SESVs_i, x \rangle$ a linear kernel function, $SESVs_i$ is the feature vector corresponding to the i-th support vector in the model's parameters, and x is the input feature vector of the three-dimensional animation scene frame;

the visual comfort scoring model of a three-dimensional animation scene is frame is:

$$Q_{VC} = \sum_{i=1}^{totalVCSV} sv\_cof_i \times \mathcal{K} \langle VCSVs_i, x \rangle$$

wherein $Q_{VC}$ is the visual comfort score of a three-dimensional animation scene frame, totalVCSV is the number of visual comfort support vectors, $sv\_cof_i$ is the coefficient value corresponding to the i-th support vector in the model's parameters, $\mathcal{K} \langle VCSVs_i, x \rangle$ is a linear kernel function, $VCSVs_i$ is the feature vector corresponding to the i-th support vector in the model's parameters, and x is the input feature vector of the three-dimensional animation scene frame.

Optionally, the method further comprises:

obtaining a three-dimensional animation scene frame to be scored;

obtaining the disparity map of the three-dimensional animation scene frame to be scored, extracting disparity statistic features of the three-dimensional animation scene frame to be scored based on its disparity map, and combining the disparity statistic features into one feature vector;

based on the feature vector, calculating the stereoscopic effect score and the visual comfort score of the three-dimensional animation scene frame to be scored respectively according to the stereoscopic effect scoring model and the visual comfort scoring model of a three-dimensional animation scene frame.

An embodiments of the present invention discloses a device for determining scoring models of a three-dimensional animation scene frame, which comprises:

a first obtaining module used to obtain a dataset of three-dimensional animation scene frames, the dataset comprising a first number of three-dimensional animation scene frames;

a second obtaining module used to obtain a predetermined stereoscopic effect standard score and a predetermined visual comfort standard score corresponding to each three-dimensional animation scene frame;

a first extracting module used to obtain the disparity map of each three-dimensional animation scene frame, extract disparity statistic features of each three-dimensional animation scene frame based on its disparity map, and combine the disparity statistic features into one feature vector;

a first determining module used to establish a first regression function, wherein the stereoscopic effect score of a three-dimensional animation scene frame is represented by the first regression function of the feature vector, solve the first regression function by using the corresponding stereoscopic effect standard scores as the output value of the first regression function and by introducing a kernel function using the method of penalty factor-support vector machine ϵ-SVR for regression, and determine a second regression function obtained by solving the first regression function as the stereoscopic effect scoring model of a three-dimensional animation scene frame; establish a third regression function, wherein the visual comfort score of a three-dimensional animation scene frame is represented by the third regression function of the feature vector, solve the third regression function by using the corresponding visual comfort standard scores as the output value of the third regression function and by introducing a kernel function using the method of penalty factor-support vector machine ϵ-SVR for regression, and determine a fourth regression function obtained by solving the third regression function as the visual comfort scoring model of a three-dimensional animation scene frame.

Optionally, the first obtaining module is specifically used to:

obtain stereoscopic image pairs of different three-dimensional animation scene frames under a same parameter setting and stereoscopic image pairs of a same scene frame under different stereoscopic parameter settings, the obtained stereoscopic image pairs being used as the dataset of three-dimensional animation scene frames.

Optionally, the first extracting module is specifically used to:

calculate the disparity statistic features according to the equations below:

$$\text{mean disparity } MD: MD = \frac{1}{MN} \sum_{i=1}^{M} \sum_{j=1}^{N} D(i, j)$$

$$\text{median disparity } MED: MED = \text{median}\left(\sum_{i=1}^{M} \sum_{j=1}^{N} D(i, j)\right)$$

$$\text{maximum positive disparity } MPD: MPD = \max \sum_{i=1}^{M} \sum_{j=1}^{N} D(i, j)$$

$$\text{maximum negative disparity } MND: MND = \min \sum_{i=1}^{M} \sum_{j=1}^{N} D(i, j)$$

$$\text{disparity standard deviation } DSD: DSD = \sqrt{\frac{1}{MN} \sum_{i=1}^{M} \sum_{j=1}^{N} D(i, j - MD)^2}$$

$$\text{mean disparity gradient } MDG: MDG = \frac{1}{MN} \sum_{i=1}^{M} \sum_{j=1}^{N} [\Delta D(i, j)]$$

wherein D(i, j) is the disparity value of each pixel in the disparity map of each three-dimensional animation scene frame, i is the abscissa of the disparity map of each three-dimensional animation scene frame, j is the ordinate of the disparity map of each three-dimensional animation scene frame, M, N are the width and the height of the disparity map of each three-dimensional animation scene frame respectively, and ΔD(i, j) is the value of each pixel in the disparity gradient map of each three-dimensional animation scene frame obtained after Laplace transform; and combine the disparity statistic features into one feature vector.

Optionally, the stereoscopic effect scoring model of a three-dimensional animation scene frame is:

$$Q_{SE} = \sum_{i=1}^{totalSESV} \text{sv\_cof}_i \times \kappa \langle SESV_{s_i}, x \rangle$$

Wherein $Q_{SE}$ is the stereoscopic effect score of a three-dimensional to animation scene frame, totalSESV is the number of stereoscopic effect support vectors, $\text{sv\_cof}_i$ is the coefficient value corresponding to the i-th support vector in the model's parameters, $\kappa \langle SESV_{s_i}, x \rangle$ is a linear kernel function, $SESV_{s_i}$ is the feature vector corresponding to the i-th support vector in the model's parameters, and x is the input feature vector of the three-dimensional animation scene frame;

the visual comfort scoring model of a three-dimensional animation scene frame is:

$$Q_{VC} = \sum_{i=1}^{totalVCSV} \text{sv\_cof}_i \times \kappa \langle VCSV_{s_i}, x \rangle$$

Wherein $Q_{VC}$ is the visual comfort score of a three-dimensional animation scene frame, totalVCSV is the number of visual comfort support vectors, $\text{sv\_cof}_i$ is the coefficient value corresponding to the i-th support vector in the model's parameters, $\kappa \langle VCSV_{s_i}, x \rangle$ is a linear kernel function, $VCSV_{s_i}$ is the feature vector corresponding to the i-th support vector in the model's parameters, and x is the input feature vector of the three-dimensional animation scene frame.

Optionally, the device further comprises:

a third obtaining module used to obtain a three-dimensional animation scene frame to be scored;

a second extracting module used to obtain the disparity map of the three-dimensional animation scene frame to be scored, extract disparity statistic features of the three-dimensional animation scene frame to be scored based on its disparity map, and combine the disparity statistic features into one feature vector;

a second determining module used to, based on the feature vector, calculate the stereoscopic effect score and the visual comfort score of the three-dimensional animation scene frame to be scored respectively according to the stereoscopic effect scoring model and the visual comfort scoring model of a three-dimensional animation scene frame.

It can be seen that in embodiments of the present invention, automatic scoring of three-dimensional animation scene frames is achieved by respectively determining the stereoscopic effect scoring model and visual comfort scoring model based on the disparity statistic features of each three-dimensional animation scene is frame in conjunction with the stereoscopic effect standard score and the visual comfort standard score of each three-dimensional animation scene frame, and influence of the subjective factors from the producers on the scoring is reduced. Moreover, the workload is reduced and the efficiency is improved. Of course, any product and method implementing the present invention does not have to achieve all of the advantages described above simultaneously.

BRIEF DESCRIPTION OF THE DRAWINGS

In order to describe embodiments of the present invention or technical solutions in existing technology more clearly, appended drawings used in embodiments or descriptions of the existing technology will be described briefly below. Apparently, the appended drawings described below are only some embodiments of the present invention, and those skilled in the art can also obtain further drawings depending on these drawings without doing creative efforts.

DETAILED DESCRIPTION

Technical solutions in the embodiments of the present invention will be described below clearly and completely in combination with the appended drawings of the embodiments of the present invention. Obviously, the described embodiments are only some of the embodiments of the present invention, rather than all of the embodiments. All other embodiments obtained based on the embodiments of the present invention by those skilled in the art without doing creative works fall into the protection scope defined by the present invention.

The present invention will be described in detail below by way of specific embodiments.

Figure 1:
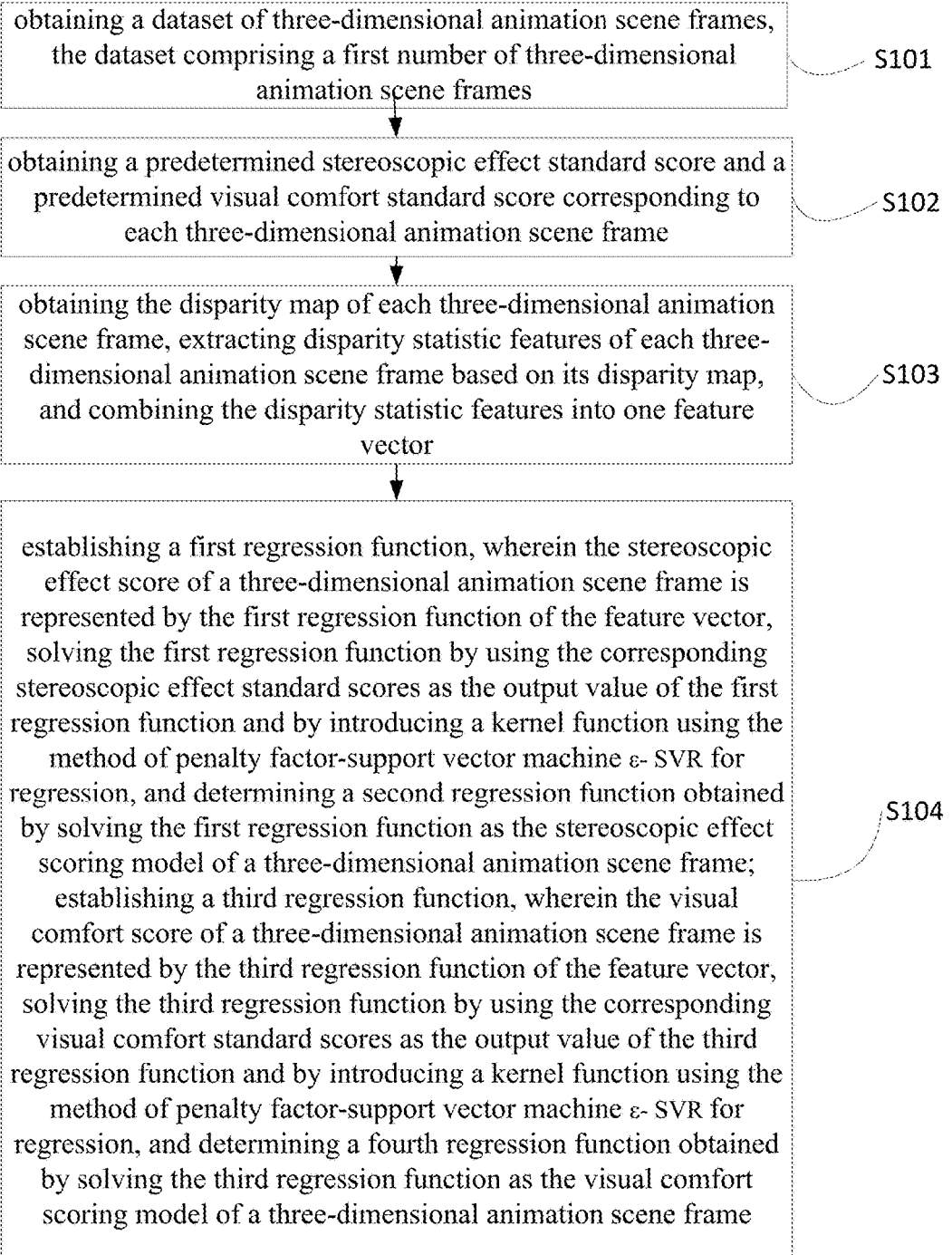
FIG. 1 is a schematic flowchart of a method for determining scoring models of a three-dimensional animation scene frame provided by an embodiment of the present invention.

FIG. 1 is a schematic flowchart of a method for determining scoring models of is a three-dimensional animation scene frame provided by an embodiment of the present invention. The method comprises the following steps:

S101: obtaining a dataset of three-dimensional animation scene frames, the dataset comprising a first number of three-dimensional animation scene frames.

The dataset of three-dimensional animation scene frames originates from the pre-production process of a three-dimensional animation and is mainly the Layout layer data. Three-dimensional animation scene frames and the content thereof are both nude models, i.e., the material, texture, light effect and the like of the three-dimensional animation scene frames are not taken into account.

Specifically, stereoscopic image pairs of different three-dimensional animation scene frames under a same parameter setting and stereoscopic image pairs of a same scene frame under different stereoscopic parameter settings are obtained, and the obtained stereoscopic image pairs are used as the dataset of three-dimensional animation scene frames.

For the same three-dimensional animation scene frame, if the stereoscopic parameter setting is different, that is, the setting parameters of the Interaxial Separation parameter of a virtual stereoscopic camera and the Zero Parallax parameter of the convergence plane are different, stereoscopic effects generated by the stereoscopic image pairs thereof are also different, wherein a stereoscopic image pair comprises a left image and a right image.

Figure 2:
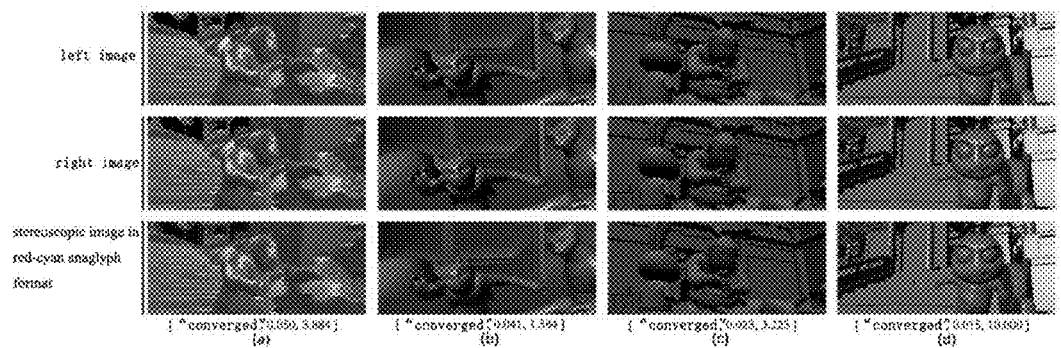
FIG. 2 are schematic views illustrating the content of three-dimensional animation scene frames provided by the embodiments of the present invention, wherein (a) is a scene frame "profile", (b) is a scene frame "seize", (c) is a scene frame "stand", and (d) is a scene frame "rush"

Therefore, the dataset of three-dimensional animation scene frames comprises not only stereoscopic image pairs of different scene frames under a same parameter setting, but also stereoscopic image pairs of a same scene frame under different stereoscopic parameter settings. FIG. 2 shows the left image, right image, and stereoscopic image in red-cyan anaglyph format of the three-dimensional animation scene frames "profile", "seize", "stand" and "rush", wherein the stereoscopic camera setting parameters of the stereoscopic image pairs of the three-dimensional animation scene frames are displayed under the images, which are the camera model type, the Interaxial Separation, and the Zero Parallax respectively.

S102: obtaining a predetermined stereoscopic effect standard score and a predetermined visual comfort standard score corresponding to each three-dimensional animation scene frame.

According to the MOS scoring method based on mean evaluating value of ITU-R BT.500, scoring method of the standard score test is set as discrete five-grade marking system, that is, 5-excellent, 4-good, 3-moderate, 2-poor, 1-very poor. Then according to the standard experimental steps of the ITU standard, subjects score the stereoscopic effect and visual comfort of the content of the stereoscopic image pairs in the dataset of three-dimensional animation scene frames.

According to the statistic method of ITU-R BT.500, outlier detection and experimenter abandoning processing are performed to the obtained scoring data using Grubbs' test, and the average of the scoring data corresponding to the content of the same stereoscopic image pair processed is calculated, finally the stereoscopic effect score and the visual comfort score of the stereoscopic image pairs of different scene frames in the dataset of three-dimensional animation scene frames and the stereoscopic effect score and the visual comfort score of the stereoscopic image pairs under different stereoscopic parameter settings of the same scene frames are obtained. The obtained stereoscopic effect score and the visual comfort score of the dataset of three-dimensional animation scene frames are used as the predetermined stereoscopic effect standard score and the predetermined visual comfort standard score corresponding to each three-dimensional animation scene frame.

Since one stereoscopic image pair comprises a left image and a right image, the scores of the left image and of the right image are both the score of the corresponding stereoscopic image pair, that is, the stereoscopic effect standard scores of the left image and of the right image are identical and the visual comfort standard scores of the left image and of the right image are also identical.

S103: obtaining the disparity map of each three-dimensional animation scene frame, extracting disparity statistic features of each three-dimensional animation scene frame based on its disparity map, and combining the disparity statistic features into one feature vector.

Figure 3:
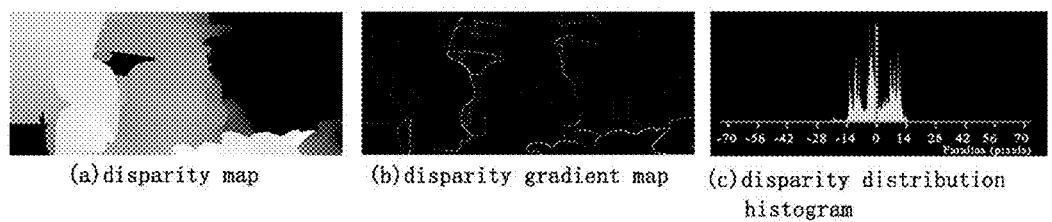
FIG. 3(a), (b), (c) are schematic views of the disparity map, the disparity gradient map, and the disparity distribution histogram extracted for the scene frame "stand" provided by the embodiments of the present invention.

The disparity map of the stereoscopic image pair is obtained by using data of a three-dimensional animation scene frame, which is mainly depth data. As shown in FIG. 3, the disparity map, the disparity gradient map and the disparity distribution histogram of the scene frame "stand" are obtained, and its disparity statistic features are calculated respectively according to these disparity map, disparity gradient map and disparity distribution histogram.

Specifically, the disparity statistic features are calculated according to the equations below:

$$\text{mean disparity } MD: MD = \frac{1}{MN}\sum_{i=1}^{M}\sum_{j=1}^{N} D(i, j)$$

$$\text{median disparity } MED: MED = \text{median}\left(\sum_{i=1}^{M}\sum_{j=1}^{N} D(i, j)\right)$$

$$\text{maximum positive disparity } MPD: MPD = \max\sum_{i=1}^{M}\sum_{j=1}^{N} D(i, j)$$

$$\text{maximum negative disparity } MND: MND = \min\sum_{i=1}^{M}\sum_{j=1}^{N} D(i, j)$$

$$\text{disparity standard deviation } DSD: DSD = \sqrt{\frac{1}{MN}\sum_{i=1}^{M}\sum_{j=1}^{N} D(i, j - MD)^2}$$

$$\text{mean disparity gradient } MDG: MDG = \frac{1}{MN}\sum_{i=1}^{M}\sum_{j=1}^{N} [\Delta D(i, j)]$$

wherein $D(i, j)$ is the disparity value of each pixel in the disparity map of each three-dimensional animation scene frame, i is the abscissa of the disparity map of each three-dimensional animation scene frame, j is the ordinate of the disparity map of each three-dimensional animation scene frame, M, N are the width and the height of the disparity map of each three-dimensional animation scene frame respectively, and $\Delta D(i, j)$ is the value of each pixel in the disparity gradient map of each three-dimensional animation scene frame obtained after Laplace transform.

Wherein MD and MED represent the value of the disparity amplitude of the stereoscopic image pair of each three-dimensional animation scene frame, while MPD and MND represent the range of the disparity amplitude of the stereoscopic is image pair of each three-dimensional animation scene frame.

Further, these disparity statistic features are combined into one feature vector for the subsequent steps.

S104: establishing a first regression function, wherein the stereoscopic effect score of a three-dimensional animation scene frame is represented by the first regression function of the feature vector, solving the first regression function by using the corresponding stereoscopic effect standard scores as the output value of the first regression function and by introducing a kernel function using the method of penalty factor-support vector machine $\epsilon$-SVR for regression, and determining a second regression function obtained by solving the first regression function as the stereoscopic effect scoring model of a three-dimensional animation scene frame; establishing a third regression function, wherein the visual comfort score of a three-dimensional animation scene frame is represented by the third regression function of the feature vector, solving the third regression function by using the corresponding visual comfort standard scores as the output value of the third regression function and by introducing a kernel function using the method of penalty factor-support vector machine $\epsilon$-SVR for regression, determining a fourth regression function obtained by solving the third regression function as the visual comfort scoring model of a three-dimensional animation scene frame.

The process to obtain the stereoscopic effect scoring model and the visual comfort scoring model of a three-dimensional animation scene frame may be regarded as a process to solve a regresssion problem, that is, seeking for the mapping relation between the feature vector and the stereoscopic effect score and the visual comfort score of a three-dimensional animation scene frame respectively.

The stereoscopic effect score of a three-dimensional animation scene frame is represented by the first regression function of feature vector x:

$$Q_{SE}=f(x)=\langle w_1,x \rangle + b_1$$

wherein $w_1$ is an unknown parameter vector, namely a weight vector, to be solved, $b_1$ is an offset value.

By seeking for a suitable relation between the feature vector x and the parameter vector $w_1$, the obtained function value $Q_{SE}$ can be highly relevant to the corresponding stereoscopic effect standard score.

During the solving process using the method of penalty factor-support vector machine $\epsilon$-SVR for regression, in order to determine the parameter vector $w_1$ and the offset value $b_1$, the question of solving the optimal regeresssion function $Q_{SE}=f(x)$ is converted into a question of optimizing the parameter vector $w_1$ and the value $b_1$ under constraints. A kernel function, a regularization constant $C_1$, and a relaxation factor $\epsilon_1$ are introduced to determine the parameter vector $w_1$ and the offset value $b_1$. K-folder cross validation and Grid-Search method are used to seek for the optimum values of the penalty factor $C_1$ and the relaxation factor $\epsilon_1$ so as to obtain the optimum effect, and in turn to obtain a second regression function after solving the first regression function. The second regression function is determined as the stereoscopic effect scoring model of a three-dimensional animation scene frame.

The visual comfort score of a three-dimensional animation scene frame is represented by the third regression function of feature vector x:

$$Q_{VC}f(x)=\langle w_2,x \rangle + b_2$$

wherein $w_2$ is an unknown parameter vector, namely a weight vector, to be solved, $b_2$ is an offset value.

By seeking for a suitable relation between the feature vector x and the parameter vector $w_2$, the obtained function value $Q_{VC}$ can be highly relevant to corresponding visual comfort standard score.

During the solving process using a method penalty factor-support vector machine $\epsilon$-SVR for regression, in order to determine the parameter vector $w_2$ and the offset value $b_2$, the question of solving the optimal regression function $Q_{VC}=f(x)$ is converted into a question of optimizing the parameter vector $w_2$ and the offset value $b_2$ under constraints. A kernel function, a regularization constant $C_2$, and a relaxation factor $\epsilon_2$ are introduced to determine the parameter vector $w_2$ and the offset value $b_2$. K-folder cross validation and Grid-Search method are used to seek for the optimum values of the penalty factor $C_2$ and the relaxation factor $\epsilon_2$ so as to obtain optimum effect, and in turn to obtain a fourth regression function after solving the third regression function. The fourth regression function is determined as the visual comfort scoring model of a three-dimensional animation scene frame.

Specifically, the stereoscopic effect scoring model of a three-dimensional animation scene frame is:

$$Q_{SE} = \sum_{i=1}^{totalSESV} \text{sv\_cof}_i \times K \langle SESVs_i, x \rangle$$

Wherein $Q_{SE}$ is the stereoscopic effect score of a three-dimensional animation scene frame, totalSESV is the number of stereoscopic effect support vectors, $\text{sv\_cof}_i$ is the coefficient value corresponding to the i-th support vector in the model's parameters, $K \langle SESVs_i, x \rangle$ is a linear kernel function, $SESVs_i$ is the feature vector corresponding to the i-th support vector in the model's parameters, and x is the input feature vector of the three-dimensional animation scene frame.

The visual comfort scoring model of a three-dimensional animation scene frame is:

$$Q_{VC} = \sum_{i=1}^{totalVCSV} \text{sv\_cof}_i \times K \langle VCSVs_i, x \rangle$$

Wherein $Q_{VC}$ is the visual comfort score of a three-dimensional animation scene frame, totalVCSV is the number of visual comfort support vectors, $\text{sv\_cof}_i$ is the coefficient value corresponding to the i-th support vector in the model's parameters, $K \langle VCSVs_i, x \rangle$ is a linear kernel function, $VCSVs_i$ is the feature vector corresponding to the i-th support vector in the model's parameters, and x is the input feature vector of the three-dimensional animation scene frame.

Further, during practical operation, the kernel function introduced when solving the first regression function and the third regression function is a linear kernel function due to its best regression effect, this linear kernel function is represented as:

$$K \langle x_j, x_k \rangle = x_j^T x_k$$

wherein $x_j$ is the feature vector of the j-th three-dimensional animation scene frame, $x_k$ is the feature vector of the k-th three-dimensional animation scene frame.

However, the present invention is not limited to the use of a linear kernel function, and the kernel function may be of other forms according to practical three-dimensional animation scene frame and the dataset of three-dimensional animation scene frames.

Even further, the method for determining scoring models of a three-dimensional animation scene frame provided by the embodiments of the present invention may further comprises:

obtaining a three-dimensional animation scene frame to be scored;

obtaining the disparity map of the three-dimensional animation scene frame to be scored, extracting disparity statistic features of the three-dimensional animation scene frame to be scored based on its disparity map, and combining the disparity statistic features into one feature vector;

based on the feature vector, calculating the stereoscopic effect score and the visual comfort score of the three-dimensional animation scene frame to be scored respectively according to the stereoscopic effect scoring model and the visual comfort scoring model of a three-dimensional animation scene frame.

Figure 4:
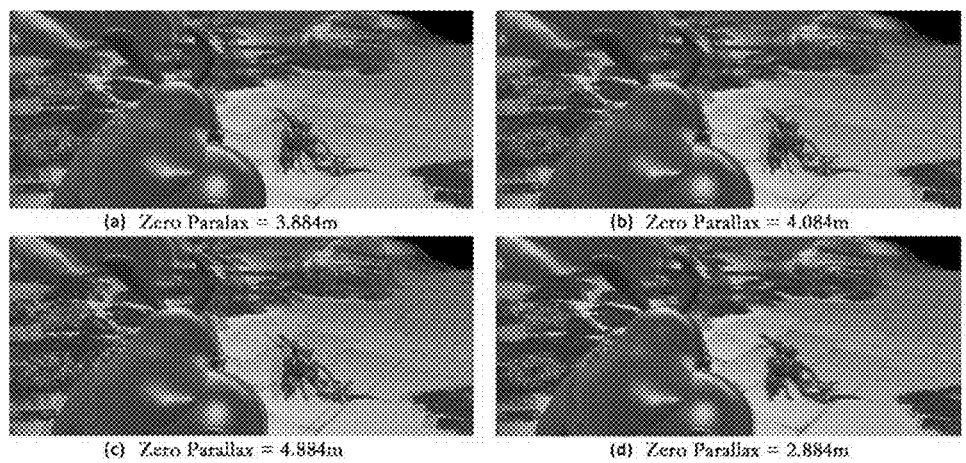
FIG. 4 are schematic views of different stereoscopic image pairs of the three-dimensional animation scene frame named "back" during the pre-production in the embodiments of the present invention, which are obtained by changing the value of Zero Parallax parameter of the convergence plane.
Figure 5:
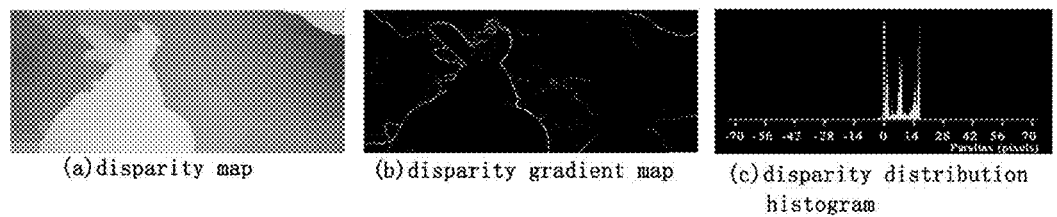
FIG. 5 are schematic views of the disparity map, the disparity gradient map, and the disparity distribution histogram extracted for the scene frame "back" of the embodiments of the present invention.
Figure 6:
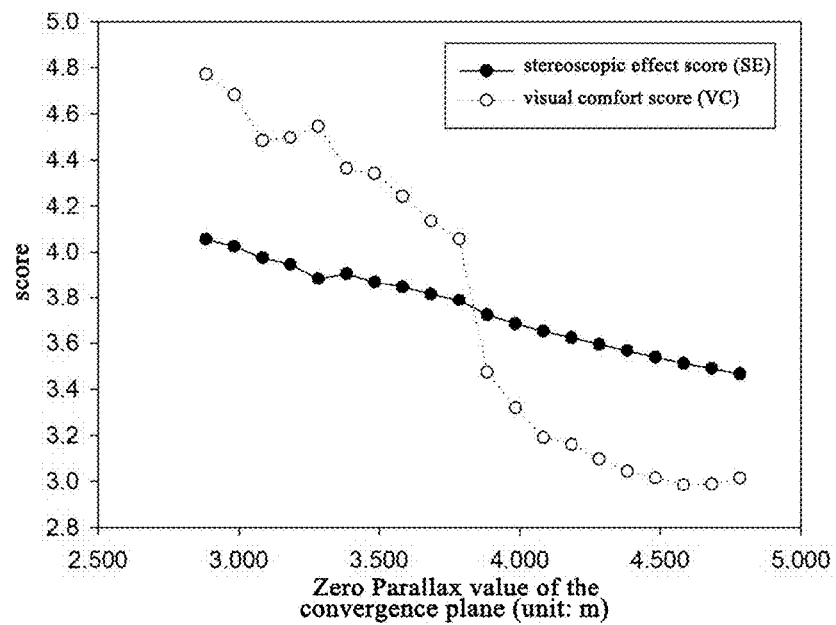
FIG. 6 is a resulting graph of the stereoscopic effect score SE and the visual comfort score VC of the three-dimensional animation scene frame "stand" of the embodiments of the present invention.

Illustration is made below in combination with a particular embodiment:

obtaining a three-dimensional animation scene frame named "back" during the pre-production process, changing the value of the Zero Parallax parameter of the convergence plane, and obtaining the stereoscopic image pairs of this three-dimensional animation scene frame, as shown in FIG. 4;

obtaining the disparity map, the disparity gradient map, and the disparity statistic histogram of the three-dimensional animation scene frame "back", as shown in FIG. 5;

extracting the disparity statistic features of the three-dimensional animation scene frame "back" based on its disparity map, and combining the disparity statistic features into one feature vector;

based on this feature vector, calculating the stereoscopic effect score and the visual comfort score of the three-dimensional animation scene frame "back" respectively according to the stereoscopic effect scoring model and the visual comfort scoring model of a three-dimensional animation scene frame, as shown in FIG. 6, and obtaining respectively the stereoscopic effect scores and visual comfort scores corresponding to the Zero Parallax value of the three-dimensional animation scene frame "back" within a range from 2.884 m to 3.884 m.

Figure 7:
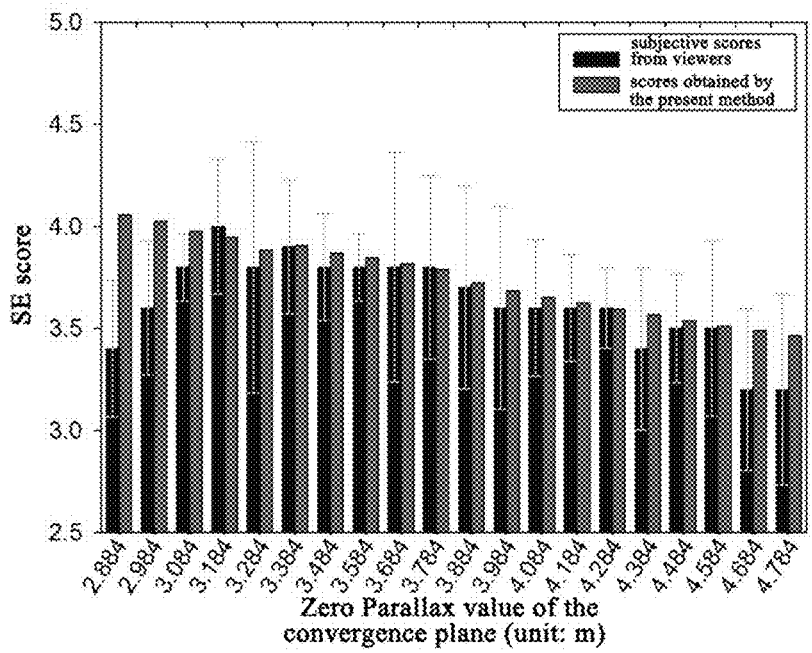
FIG. 7 is a statistic histogram of the stereoscopic effect score SE of the three-dimensional animation scene frame "back" and the subjective score of a viewer obtained for the scene frame "back" in the embodiments of the present invention.
Figure 8:
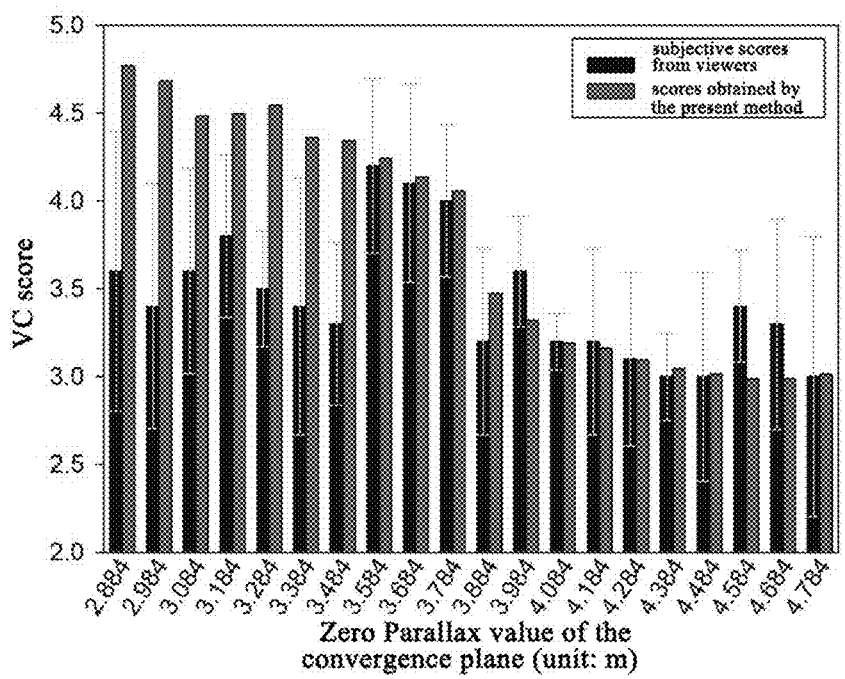
FIG. 8 is a statistic histogram of the visual comfort score VC of the three-dimensional animation scene frame "back" and the subjective score of a viewer obtained for the scene frame "back" in the embodiments of the present invention.

In order to verify the validity of the method of the present invention, comparison is made between the stereoscopic effect score SE and the visual comfort score VC of a three-dimensional animation scene frame obtained by using the method of the present invention and those subjective scores from viewers, as shown in FIGS. 7 and 8.

Four conventional correlation index are used to verify the validity of the scoring models of a three-dimensional animation scene frame, which are: Pearson Linear Correlation Coefficient (PLCC), Spearman Rank Correlation Coefficient (SRCC), Kendall Rank Correlation Coefficient (KRCC) and Root-Mean-Square Error (RMSE), respectively, wherein the closer RMSE is to 0 and the closer PLCC, SRCC, KRCC are to 1, the more correlated subjective scores are to the objective scores. The correlation coefficients between the stereoscopic effect scores SE and the visual comfort scores VC of a three-dimensional animation scene frame obtained by using the method of the present invention and the subjective scores are shown in Table 1.

TABLE 1

|  | PLCC | SRCC | KRCC | RMSE |
|---|---|---|---|---|
| SE score | 0.7109 | 0.7240 | 0.6358 | 0.0248 |
| VC score | 0.6797 | 0.6994 | 0.5934 | 0.0482 |

Figure 9:
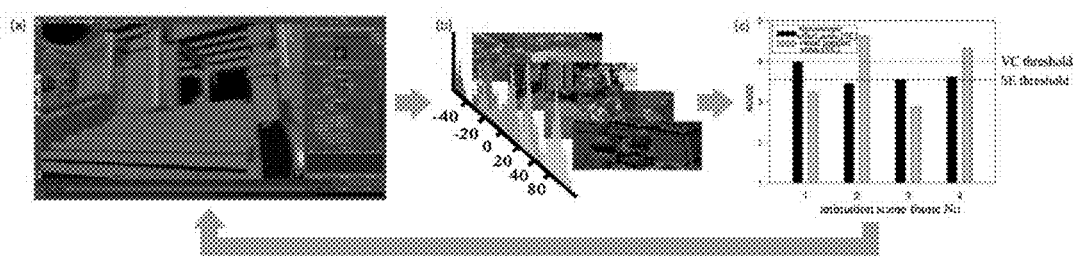
FIG. 9 is a schematic view of production process to embed the scoring method of the present invention into the pre-production process of the three-dimensional animation so as to achieve the interactive adjustment of the three-dimensional animation stereoscopic effect with evaluating feedback function.

The stereoscopic effect scores SE and the visual comfort scores VC of a three-dimensional animation scene frame obtained by the present invention can be used to regulate the feedback of the pre-production of the three-dimensional animation. FIG. 9 is a schematic view of the production process to embed the scoring method of a three-dimensional animation scene frame of the present invention into the pre-production process of the three-dimensional animation, so as to achieve the interactive adjustment of the stereoscopic effect of a three-dimensional animation with evaluating feedback function. By analyzing the disparity distribution map of the stereoscopic image pair corresponding to the three-dimensional animation scene frame input in FIG. 9(a), the analyzing process as shown in FIG. 9(b), and then by using the scoring models of a three-dimensional animation scene frame proposed by the present invention, the stereoscopic effect is score SE and the visual comfort score VC of a three-dimensional animation scene frame can be obtained automatically. According to scoring results, animation producers adjust the stereoscopic parameter of the three-dimensional animation scene frames having a score below a threshold, otherwise the preceding parameter settings are kept. This process is repeated until scores are all above the threshold, as shown in FIG. 9(c).

It can be seen that in the embodiments of the present invention, by respectively determining the stereoscopic effect scoring model and visual comfort scoring model based on the disparity statistic features of each three-dimensional animation scene frame in conjunction with the corresponding stereoscopic effect standard score and visual comfort standard score, the influence of the subjective factors from the producers is reduced, with reduced workload and improved efficiency.

Figure 10:
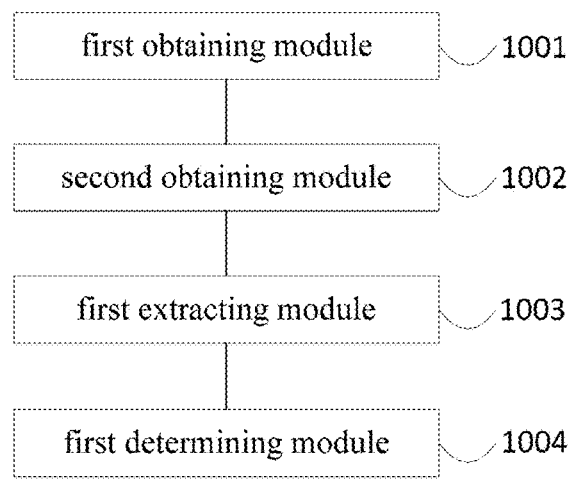
FIG. 10 is a schematic structural view of a device for determining scoring models of a three-dimensional animation scene frame provided by the embodiments of the present invention.

FIG. 10 is a schematic structural view of a device for determining scoring models of a three-dimensional animation scene frame, which corresponds to the flowchart shown in FIG. 1, the device comprising a first obtaining module 1001, a second obtaining module 1002, a first extracting module 1003 and a first determining module 1004.

The first obtaining module 1001 is used to obtain a dataset of three-dimensional animation scene frames, the dataset comprising a first number of three-dimensional animation scene frames;

the second obtaining module 1002 is used to obtain a predetermined stereoscopic effect standard score and a predetermined visual comfort standard score corresponding to each three-dimensional animation scene frame;

the first extracting module 1003 is used to obtain the disparity map of each three-dimensional animation scene frame, extract disparity statistic features of each three-dimensional animation scene frame based on its disparity map, and combine is the disparity statistic features into one feature vector;

the first determining module 1004 is used to establish a first regression function, wherein the stereoscopic effect score of a three-dimensional animation scene frame is represented by the first regression function of the feature vector, solve the first regression function by using the corresponding stereoscopic effect standard scores as the output value of the first regression function and by introducing a kernel function using the method of penalty factor-support vector machine ε-SVR for regression, and determine a second regression function obtained by solving the first regression function as the stereoscopic effect scoring model of a three-dimensional animation scene frame; establish a third regression function, wherein the visual comfort score of a three-dimensional animation scene frame is represented by the third regression function of the feature vector, solve the third regression function by using the corresponding visual comfort standard scores as the output value of the third regression function and by introducing a kernel function using the method of penalty factor-support vector machine ε-SVR for regression, and determine a fourth regression function obtained by solving the third regression function as the visual comfort scoring model of a three-dimensional animation scene frame.

The first obtaining module 1001 is specifically used to:

obtain stereoscopic image pairs of different three-dimensional animation scene frames under a same parameter setting and stereoscopic image pairs of a same scene frame under different stereoscopic parameter settings, the obtained stereoscopic image pairs being used as the dataset of three-dimensional animation scene frames.

The first extracting module 1003 is specifically used to:

calculate the disparity statistic features according to the equations below:

$$\text{mean disparity } MD: MD = \frac{1}{MN} \sum_{i=1}^{M} \sum_{j=1}^{N} D(i, j)$$

$$\text{median disparity } MED: MED = \text{median}\left(\sum_{i=1}^{M} \sum_{j=1}^{N} D(i, j)\right)$$

$$\text{maximum positive disparity } MPD: MPD = \max \sum_{i=1}^{M} \sum_{j=1}^{N} D(i, j)$$

$$\text{maximum negative disparity } MND: MND = \min \sum_{i=1}^{M} \sum_{j=1}^{N} D(i, j)$$

$$\text{disparity standard deviation } DSD: DSD = \sqrt{\frac{1}{MN} \sum_{i=1}^{M} \sum_{j=1}^{N} D(i, j - MD)^2}$$

$$\text{mean disparity gradient } MDG: MDG = \frac{1}{MN} \sum_{i=1}^{M} \sum_{j=1}^{N} [\Delta D(i, j)]$$

wherein $D(i, j)$ is the disparity value of each pixel in the disparity map of each three-dimensional animation scene frame, i is the abscissa of the disparity map of each three-dimensional animation scene frame, j is the ordinate of the disparity map of each three-dimensional animation scene frame, M, N are the width and the height of the disparity map of each three-dimensional animation scene frame respectively, and $\Delta D(i, j)$ is the value of each pixel in the disparity gradient map of each three-dimensional animation scene frame obtained after Laplace transform; and combine the disparity statistic features into one feature vector.

Wherein, the stereoscopic effect scoring model of a three-dimensional animation scene frame is:

$$Q_{SE} = \sum_{i=1}^{totalSESV} \text{sv\_cof}_i \times \kappa \langle SESVs_i, x \rangle$$

wherein $Q_{SE}$ is the stereoscopic effect score of a three-dimensional animation scene frame, totalSESV is the number of stereoscopic effect support vectors, sv\_cof$_i$ is the coefficient value corresponding to the i-th support vector in the model's parameters, $\kappa \langle SESVs_i, x \rangle$ is a linear kernel function, SESVs$_i$ is the feature vector corresponding to the i-th support vector in the model's parameters, and x is the input feature vector of the three-dimensional animation scene frame;

the visual comfort scoring model of a three-dimensional animation scene frame is:

$$Q_{VC} = \sum_{i=1}^{totalVCSV} \text{sv\_cof}_i \times \kappa \langle VCSVs_i, x \rangle$$

wherein, $Q_{VC}$ is the visual comfort score of a three-dimensional animation scene frame, totalVCSV is the number of visual comfort support vectors, sv\_cof$_i$ is the coefficient value corresponding to the i-th support vector in the model's parameters, $\kappa \langle VCSVs_i, x \rangle$ is a linear kernel function, VCSVs$_i$ is the feature vector corresponding to the i-th support vector in the model's parameters, and x is the input feature vector of the three-dimensional animation scene frame.

The device further comprises:

a third obtaining module used to obtain a three-dimensional animation scene frame to be scored;

a second extracting module used to obtain the disparity map of the three-dimensional animation scene frame to be scored, extract disparity statistic features of the three-dimensional animation scene frame to be scored based on its disparity map, and combine the disparity statistic features into one feature vector;

a second determining module used to, based on the feature vector, calculate the stereoscopic effect score and the visual comfort score of the three-dimensional animation scene frame to be scored respectively according to the stereoscopic effect scoring model and the visual comfort scoring model of a three-dimensional animation scene frame.

It can be seen that in the embodiments of the present invention, by respectively determining the stereoscopic effect scoring model and visual comfort scoring model based on the disparity statistic features of each three-dimensional animation scene frame in conjunction with the corresponding stereoscopic effect standard score and visual comfort standard score, the influence of the subjective factors from the producers on the scoring is reduced, with reduced work effort and improved efficiency.

The embodiments of the device are briefly described and reference can be made to the description of the embodiments of the method for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

Each of the embodiments in this description is described in a manner that they are associated with each other. Identical or similar parts among these various embodiments can be found by reference to each other, and each embodiment emphasizes the difference between itself and other embodiments. Particularly, the embodiments of the device are briefly described and reference can be made to the description of the embodiments of the method for its related contents since the embodiments of the device are substantially similar to those of the method.

The embodiments described above are just preferable embodiments of the present invention, and not indented to limit the protection scope of the present invention. Any modifications, alternatives, improvements or the like within the spirit and principle of the present invention are included in the protection scope of the present invention.

What is claimed is:

1. A method performed by a device for determining scoring models of a three-dimensional animation scene frame, characterized in that the device comprising a processor, the processor executing the steps of:
    obtaining a dataset of three-dimensional animation scene frames, the dataset comprising a first number of three-dimensional animation scene frames;
    obtaining a predetermined stereoscopic effect standard score and a predetermined visual comfort standard score corresponding to each three-dimensional animation scene frame;
    obtaining a disparity map of each three-dimensional animation scene frame, extracting disparity statistic features of each three-dimensional animation scene frame based on its disparity map, and combining the disparity statistic features into one feature vector;
    establishing a first regression function, wherein the stereoscopic effect score of a three-dimensional animation scene frame is represented by the first regression function of the feature vector, solving the first regression function by using the corresponding stereoscopic effect standard scores as the output value of the first regression function and by introducing a kernel function using the method of penalty factor-support vector machine ϵ-SVR for regression, and determining a second regression function obtained by solving the first regression function as the stereoscopic effect scoring model of a three-dimensional animation scene frame;
    establishing a third regression function, wherein the visual comfort score of a three-dimensional animation scene frame is represented by the third regression function of the feature vector, solving the third regression function by using the corresponding visual comfort standard scores as the output value of the third regression function and by introducing a kernel function using the method of penalty factor-support vector machine ϵ-SVR for regression, and determining a fourth regression function obtained by solving the third regression function as the visual comfort scoring model of a three-dimensional animation scene frame;
    the step of extracting disparity statistic features of each three-dimensional animation scene frame based on its disparity map executed by the processor comprises:
    calculating the disparity statistic features according to the equations below:

$$\text{mean disparity } MD: MD = \frac{1}{MN}\sum_{i=1}^{M}\sum_{j=1}^{N} D(i, j)$$

$$\text{median disparity } MED: MED = \text{median}\left(\sum_{i=1}^{M}\sum_{j=1}^{N} D(i, j)\right)$$

$$\text{maximum positive disparity } MPD: MPD = \max\sum_{i=1}^{M}\sum_{j=1}^{N} D(i, j)$$

$$\text{maximum negative disparity } MND: MND = \min\sum_{i=1}^{M}\sum_{j=1}^{N} D(i, j)$$

$$\text{disparity standard deviation } DSD: DSD = \sqrt{\frac{1}{MN}\sum_{i=1}^{M}\sum_{j=1}^{N} D(i, j - MD)^2}$$

$$\text{mean disparity gradient } MDG: MDG = \frac{1}{MN}\sum_{i=1}^{M}\sum_{j=1}^{N} [\Delta D(i, j)]$$

wherein $D(i, j)$ is the disparity value of each pixel in the disparity map of each three-dimensional animation scene frame, i is the abscissa of the disparity map of each three-dimensional animation scene frame, j is the ordinate of the disparity map of each three-dimensional animation scene frame, M, N are the width and the height of the disparity map of each three-dimensional animation scene frame respectively, and $\Delta D(i, j)$ is the value of each pixel in the disparity gradient map of each three-dimensional animation scene frame obtained after Laplace transform.

2. The method according to claim 1, characterized in that the obtaining a dataset of three-dimensional animation scene frames comprises:
    obtaining stereoscopic image pairs of different three-dimensional animation scene frames under a same parameter setting and stereoscopic image pairs of a same scene frame under different stereoscopic parameter settings, the obtained stereoscopic image pairs being used as the dataset of three-dimensional animation scene frames.

3. The method according to claim 1, characterized in that the method further comprises:
    obtaining a three-dimensional animation scene frame to be scored;
    obtaining the disparity map of the three-dimensional animation scene frame to be scored, extracting disparity statistic features of the three-dimensional animation scene frame to be scored based on its disparity map, and combining the disparity statistic features into one feature vector;
    based on the feature vector, calculating the stereoscopic effect score and the visual comfort score of the three-dimensional animation scene frame to be scored respectively according to the stereoscopic effect scoring model and the visual comfort scoring model of a three-dimensional animation scene frame.

4. The method according to claim 1, characterized in that the method further comprises:
    obtaining a three-dimensional animation scene frame to be scored;
    obtaining the disparity map of the three-dimensional animation scene frame to be scored, extracting disparity statistic features of the three-dimensional animation scene frame to be scored based on its disparity map, and combining the disparity statistic features into one feature vector;

based on the feature vector, calculating the stereoscopic effect score and the visual comfort score of the three-dimensional animation scene frame to be scored respectively according to the stereoscopic effect scoring model and the visual comfort scoring model of a three-dimensional animation scene frame.

5. The method according to claim 1, characterized in that the stereoscopic effect scoring model of a three-dimensional animation scene frame is:

$$Q_{SE} = \sum_{i=1}^{totalSESV} \text{sv\_cof}_i \times \kappa \langle SESV s_i, x \rangle$$

wherein $Q_{SE}$ is the stereoscopic effect score of a three-dimensional animation scene frame, totalSESV is the number of stereoscopic effect support vectors, $\text{sv\_cof}_i$ is the coefficient value corresponding to the i-th support vector in the model's parameters, $\kappa \langle SESVs_i, x \rangle$ is a linear kernel function, $SESVs_i$ is the feature vector corresponding to the i-th support vector in the model's parameters, and x is the input feature vector of the three-dimensional animation scene frame;

the visual comfort scoring model of a three-dimensional animation scene frame is:

$$Q_{VC} = \sum_{i=1}^{totalVCSV} \text{sv\_cof}_i \times \kappa \langle VCSVs_i, x \rangle$$

wherein $Q_{V}c$ is the visual comfort score of a three-dimensional animation scene frame, totalVCSV is the number of visual comfort support vectors $\text{sv\_cof}_i$ is the coefficient value corresponding to the i-th support vector in the model's parameters, $\kappa \langle VCSVs_i, x \rangle$ is a linear kernel function, $VCSVs_i$ is the feature vector corresponding to the i-th support vector in the model's parameters, and x is the input feature vector of the three-dimensional animation scene frame.

6. The method according to claim 5, characterized in that the method further comprises:

obtaining a three-dimensional animation scene frame to be scored;

obtaining the disparity map of the three-dimensional animation scene frame to be scored, extracting disparity statistic features of the three-dimensional animation scene frame to be scored based on its disparity map, and combining the disparity statistic features into one feature vector;

based on the feature vector, calculating the stereoscopic effect score and the visual comfort score of the three-dimensional animation scene frame to be scored respectively according to the stereoscopic effect scoring model and the visual comfort scoring model of a three-dimensional animation scene frame.

7. The method according to claim 2, characterized in that the method further comprises:

obtaining a three-dimensional animation scene frame to be scored;

obtaining the disparity map of the three-dimensional animation scene frame to be scored, extracting disparity statistic features of the three-dimensional animation scene frame to be scored based on its disparity map, and combining the disparity statistic features into one feature vector;

based on the feature vector, calculating the stereoscopic effect score and the visual comfort score of the three-dimensional animation scene frame to be scored respectively according to the stereoscopic effect scoring model and the visual comfort scoring model of a three-dimensional animation scene frame.

8. A device for determining scoring models of a three-dimensional animation scene frame, characterized in that the device comprises:

a processor and a memory, wherein a plurality of executable modules including a first obtaining module, a second obtaining module, a first extracting module and a first determining module are stored in the memory, which are executable by the processor to determine scoring models of a three-dimensional animation scene frame; wherein, the first obtaining module is executed to obtain a dataset of three-dimensional animation scene frames, the dataset comprising a first number of three-dimensional animation scene frames;

the second obtaining module is executed to obtain a predetermined stereoscopic effect standard score and a predetermined visual comfort standard score corresponding to each three-dimensional animation scene frame;

the first extracting module is executed to obtain a disparity map of each three-dimensional animation scene frame, extract disparity statistic features of each three-dimensional animation scene frame based on its disparity map, and combine the disparity statistic features into one feature vector;

the first determining module is executed to establish a first regression function, wherein the stereoscopic effect score of a three-dimensional animation scene frame is represented by the first regression function of the feature vector, solve the first regression function by using the corresponding stereoscopic effect standard scores as the output value of the first regression function and by introducing a kernel function using the method of penalty factor-support vector machine ϵ-SVR for regression, and determine a second regression function obtained by solving the first regression function as the stereoscopic effect scoring model of a three-dimensional animation scene frame; establish a third regression function, wherein the visual comfort score of a three-dimensional animation scene frame is represented by the third regression function of the feature vector, solve the third regression function by using the corresponding visual comfort standard scores as the output value of the third regression function and by introducing a kernel function using the method of penalty factor-support vector machine ϵ-SVR for regression, and determine a fourth regression function obtained by solving the third regression function as the visual comfort scoring model of a three-dimensional animation scene frame;

the first extracting module is executed to:

calculate the disparity statistic features according to the equations below:

mean disparity $MD$: $MD = \dfrac{1}{MN} \sum_{i=1}^{M} \sum_{j=1}^{N} D(i, j)$

-continued $$\text{median disparity } MED: MED = \text{median}\left(\sum_{i=1}^{M}\sum_{j=1}^{N} D(i, j)\right)$$

$$\text{maximum positive disparity } MPD: MPD = \max\sum_{i=1}^{M}\sum_{j=1}^{N} D(i, j)$$

$$\text{maximum negative disparity } MND: MND = \min\sum_{i=1}^{M}\sum_{j=1}^{N} D(i, j)$$

$$\text{disparity standard deviation } DSD: DSD = \sqrt{\frac{1}{MN}\sum_{i=1}^{M}\sum_{j=1}^{N} D(i, j - MD)^2}$$

$$\text{mean disparity gradient } MDG: MDG = \frac{1}{MN}\sum_{i=1}^{M}\sum_{j=1}^{N} [\Delta D(i, j)]$$

wherein D(i, j) is the disparity value of each pixel in the disparity map of each three-dimensional animation scene frame, i is the abscissa of the disparity map of each three-dimensional animation scene frame, j is the ordinate of the disparity map of each three-dimensional animation scene frame, M, N are the width and the height of the disparity map of each three-dimensional animation scene frame respectively, and ΔD(i, j) is the value of each pixel in the disparity gradient map of each three-dimensional animation scene frame obtained after Laplace transform; and combine the disparity statistic features into one feature vector.

9. The device according to claim 8, characterized in that the first obtaining module is executed to:

obtain stereoscopic image pairs of different three-dimensional animation scene frames under a same parameter setting and stereoscopic image pairs of a same scene frame under different stereoscopic parameter settings, the obtained stereoscopic image pairs being used as the dataset of three-dimensional animation scene frames.

10. The device according to claim 8, characterized in that the device further comprises:

a third obtaining module executed to obtain a three-dimensional animation scene frame to be scored;

a second extracting module executed to obtain the disparity map of the three-dimensional animation scene frame to be scored, extract disparity statistic features of the three-dimensional animation scene frame to be scored based on its disparity map, and combine the disparity statistic features into one feature vector;

a second determining module executed to, based on the feature vector, calculate the stereoscopic effect score and the visual comfort score of the three-dimensional animation scene frame to be scored respectively according to the stereoscopic effect scoring model and the visual comfort scoring model of a three-dimensional animation scene frame.

11. The device according to claim 8, characterized in that the device further comprises:

a third obtaining module executed to obtain a three-dimensional animation scene frame to be scored;

a second extracting module executed to obtain the disparity map of the three-dimensional animation scene frame to be scored, extract disparity statistic features of the three-dimensional animation scene frame to be scored based on its disparity map, and combine the disparity statistic features into one feature vector;

a second determining module executed to, based on the feature vector, calculate the stereoscopic effect score and the visual comfort score of the three-dimensional animation scene frame to be scored respectively according to the stereoscopic effect scoring model and the visual comfort scoring model of a three-dimensional animation scene frame.

12. The device according to claim 8, characterized in that the stereoscopic effect scoring model of a three-dimensional animation scene frame is:

$$Q_{SE} = \sum_{i=1}^{totalSESV} sv\_cof_i \times \kappa \langle SESVs_i, x \rangle$$

Wherein $Q_{SE}$ is the stereoscopic effect score of a three-dimensional animation scene frame, totalSESV is the number of stereoscopic effect support vectors, $sv\_cof_i$ is the coefficient value corresponding to the i-th support vector in the model's parameters, $\kappa \langle SESVs_i, x \rangle$ is a linear kernel function, $SESVs_i$ is the feature vector corresponding to the i-th support vector in the model's parameters, and x is the input feature vector of the three-dimensional animation scene frame;

the visual comfort scoring model of a three-dimensional animation scene frame is:

$$Q_{VC} = \sum_{i=1}^{totalVCSV} sv\_cof_i \times \kappa \langle VCSVs_i, x \rangle$$

Wherein $Q_{VC}$c is the visual comfort score of a three-dimensional animation scene frame, totalVCSV is the number of visual comfort support vectors $sv\_cof_i$ is the coefficient value corresponding to the i-th support vector in the model's parameters, $\kappa \langle VCSVs_i, x \rangle$ is a linear kernel function, $VCSVs_i$ is the feature vector corresponding to the i-th support vector in the model's parameters, and x is the input feature vector of the three-dimensional animation scene frame.

13. The device according to claim 12, characterized in that the device further comprises:

a third obtaining module executed to obtain a three-dimensional animation scene frame to be scored;

a second extracting module executed to obtain the disparity map of the three-dimensional animation scene frame to be scored, extract disparity statistic features of the three-dimensional animation scene frame to be scored based on its disparity map, and combine the disparity statistic features into one feature vector;

a second determining module executed to, based on the feature vector, calculate the stereoscopic effect score and the visual comfort score of the three-dimensional animation scene frame to be scored respectively according to the stereoscopic effect scoring model and the visual comfort scoring model of a three-dimensional animation scene frame.

14. The device according to claim 9, characterized in that the device further comprises:

a third obtaining module executed to obtain a three-dimensional animation scene frame to be scored;

a second extracting module executed to obtain the disparity map of the three-dimensional animation scene frame to be scored, extract disparity statistic features of the three-dimensional animation scene frame to be scored based on its disparity map, and combine the disparity statistic features into one feature vector;

a second determining module executed to, based on the feature vector, calculate the stereoscopic effect score and the visual comfort score of the three-dimensional animation scene frame to be scored respectively according to the stereoscopic effect scoring model and the visual comfort scoring model of a three-dimensional animation scene frame.

* * * * *